United States Patent [19]
Chambers, Jr. et al.

[11] 3,818,338
[45] June 18, 1974

[54] MAGNETIZING CURRENT COMPENSATING CIRCUIT

[75] Inventors: Charles W. Chambers, Jr., Amherst; Frederick J. Kiko, Sheffield Village, both of Ohio

[73] Assignee: Lorain Products Corporation, Lorain, Ohio

[22] Filed: Sept. 21, 1972

[21] Appl. No.: 291,001

[52] U.S. Cl. .................. 324/127, 323/6, 324/132
[51] Int. Cl. ...................... G01r 1/20, G01r 15/10
[58] Field of Search .............. 324/127, 117 R, 132; 323/6; 307/93, 101

[56] References Cited
UNITED STATES PATENTS
2,954,523  9/1960  Rosenstock ........................ 324/127
3,497,793  2/1970  Gasparini et al ..................... 323/6

Primary Examiner—Alfred E. Smith
Assistant Examiner—Ernest F. Karlsen

[57] ABSTRACT

A circuit for eliminating the effect of magnetizing current flow on load current measurements made through transformers. A current indicating network provides an output voltage proportional to both the magnetizing and load components of the current through a transformer without substantially affecting the magnitude of the voltage across or current through that transformer. A compensating current generating circuit generates a current which is equal in magnitude and opposite in phase to the magnetizing current flow through the transformer over a wide band of frequencies. This compensating current is applied to the current indicating network in cancelling relationship to the magnetizing current component of the current through the transformer to render the output voltage indication independent of magnetizing current flow so that the load current component can be accurately measured.

10 Claims, 1 Drawing Figure

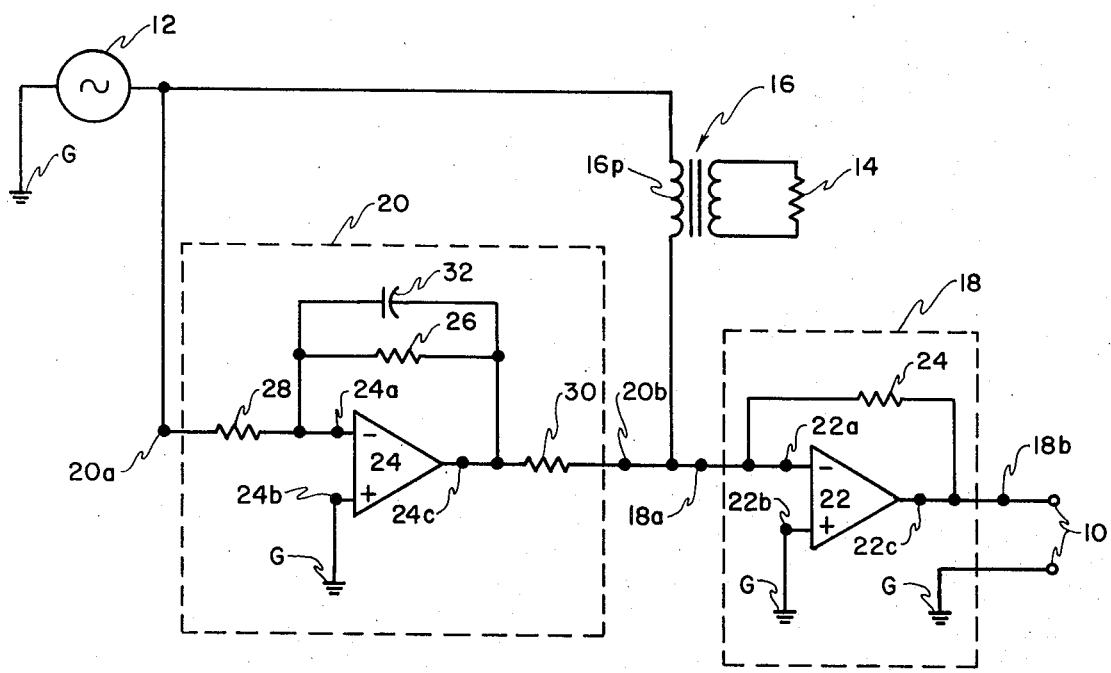

3,818,338

MAGNETIZING CURRENT COMPENSATING CIRCUIT

BACKGROUND OF THE INVENTION

The present invention relates to circuitry for improving the accuracy of electrical measurements and is directed more particularly to circuitry for eliminating the effect of magnetizing current flow on electrical measurements which are made through transformers.

Under circumstances where measurements of an instantaneous load current must be made through a transformer, it has been difficult to obtain current readings which accurately reflect the magnitude of the low frequency components of a multi-frequency signal, that is, a signal which has a plurality of components of differing frequencies. This difficulty results from the flow of frequency dependent magnetizing currents through the transformer, the effect of these currents being greater on the low frequency components of the multi-frequency signal than on the high frequency components thereof. While the effect of magnetizing current flow may be taken into account and allowed for at any single frequency of measurement, it has not, prior to the present invention, been possible to eliminate the effect thereof when a multi-frequency signal is involved. As a result, it has not been possible to make a current measurement which accurately reflects the instantaneous magnitude of a multi-frequency signal current in the secondary winding of a transformer.

In accordance with the present invention there is provided circuitry for substantially eliminating the effect of transformer magnetizing current flow and thus providing an accurate indication of instantaneous amplitude of multi-frequency signals.

SUMMARY OF THE INVENTION

It is an object of the invention to provide circuitry for improving the accuracy of those multi-frequency current measurements which must be made through transformers.

Another object of the invention is to provide circuitry for eliminating the effect of magnetizing current flow on measurements of the instantaneous value of a multi-frequency signal current.

It is another object of the invention to provide current indicating means which establishes an output voltage that is proportional to the current being measured and which has no substantial effect upon the voltage across or current through the transformer through which current measurements are made.

Yet another object of the invention is to provide current indicating means that is adapted to provide an output voltage proportional to the algebraic sum of a plurality of currents applied to the input thereof.

Still another object of the invention is to generate a compensating current that is substantially equal to the magnetizing current of a transformer and to apply that compensating current to the above current indicating means in cancelling relationship to the magnetizing current applied thereto.

Another object of the invention is to provide a compensating current generator of the above character comprising operational amplifier circuitry including resistors and capacitors having values determined by the series resistance and magnetizing inductance of the transformer through which current measurements are to be made thus eliminating the need for inductors and the circuit problems they can present.

DESCRIPTION OF THE DRAWINGS

The single FIGURE is a schematic diagram of one embodiment of the invention.

DESCRIPTION OF THE INVENTION

Referring to the drawing there is shown circuitry for establishing at an output 10, a voltage proportional to the instantaneous current which a multi-frequency a-c source 12 establishes in a load 14 through a transformer 16. In the present embodiment, the circuit of the invention includes current indicating means 18 for generating at the output 18$b$ thereof a voltage which is proportional to the algebraic sum of the currents flowing into the input 18$a$ thereof. The circuit of the invention also includes compensating current generating means 20 for generating at the output 20$b$ thereof a current which is equal to the magnetizing current component of the current flowing through the primary winding 16$p$ of transformer 16. The circuit of the invention also includes connecting means for applying the load current component of the current through primary winding 16$p$ in energizing relationship to current indicating means 18 and for applying the magnetizing current component of current through winding 16$p$ and the compensating current generated by compensating current generator 20 in mutually cancelling relationship to current indicating means 18.

To the end that the load component of the current through primary winding 16$p$ may be substantially unaffected by the presence of current indicating means 18, the latter includes an operational amplifier 22 having an inverting input 22$a$, a non-inverting input 22$b$ and an output 22$c$. Current indicating means 18 also includes a resistor 24 for providing negative feedback between amplifier input 22$c$ and amplifier input 22$a$.

Since the voltage between operational amplifier inputs 22$a$ and 22$b$ must be substantially equal to zero, the lower end of primary winding 16$p$ is substantially at the potential of ground G. Since, in addition, one lead of source 12 is also connected to ground G, it is apparent that the voltage across source 12 is substantially equal to the voltage across primary winding 16$p$. Thus, the presence of current indicating means 18 does not affect the voltage across primary winding 16$p$.

Although the voltage between amplifier inputs 22$a$ and 22$b$ is substantially equal to zero, the latter inputs do not provide a path for the flow of primary winding current to ground. This is because amplifier 22 has a high input impedance. Instead, the current through primary winding 16$p$ flows through resistor 24 to produce the voltage at output 22$c$ of amplifier 22. The flow of this current is not impeded by amplifier 22 and resistor 24 because the voltage across resistor 24 is equal and opposite to the voltage between ground G and amplifier output 22$c$, a condition which results from the fact that amplifier input 22$a$ must be substantially at ground potential. Thus, current indicating means 18 does not affect the magnitude of current flow through primary winding 16$p$ of transformer 16.

Since the voltage between amplifier output 22$c$ and ground is equal to the voltage across resistor 24, and since the voltage across resistor 24 is, in turn, equal to the product of the current through winding 16$p$ and the resistance of resistor 24, it is apparent that the magnitude of the voltage between amplifier output 22c and ground is proportional to the current through transformer 16, the constant of proportionality being the resistance of resistor 24. Thus, current indicating means 18 provides at output 10 a voltage proportional to the current in the primary winding of transformer 16 without affecting the magnitude of either the voltage across or the current through primary winding 16p.

As a result of the fact that transformer 16 exhibits a frequency dependent magnetizing impedance, the current through primary winding 16p includes a load current component which results from the flow of current through load 14 and a frequency dependent magnetizing current component which results from the magnetizing impedance of transformer 16. In the absence of compensating current generating circuit 20, both of these components of current affect the magnitude of the voltage at output 10, thus rendering that voltage inaccurate as an indication of instantaneous load current. This inaccuracy results in large part from the presence of the low frequency components of the input voltage, the magnetizing impedance of transformer 16 being low at these low frequencies.

In order to eliminate the effect of the magnetizing current of transformer 16 on the voltage at output 10, there is provided a compensating current generating circuit 20. The latter circuit serves to apply to current indicating means 18 a current which is equal in magnitude and opposite in phase to the magnetizing component of the current through primary winding 16p. This assures that the effect of the magnetizing component of current through primary winding 16p is cancelled by the equal and opposite effect of the current supplied by generating means 20, and thereby assures that the output voltage at output terminal 10 is determined only by the voltage source 12 and the impedance of load 14.

To the end that current generator 20 may generate a current suitable for cancelling the magnetizing current of transformer 16 for all components of a multifrequency signal, generating means 20 includes an operational amplifier 24 having an inverting input 24a, a non-inverting input 24b and an output 24c. Current generator 20 also includes a network including resistors 26, 28 and 30 and a capacitor 32. This network causes the current flowing out of generator output 20b to vary with the voltage across terminals 20a and 20b in the same manner that the magnetizing current through winding 16p varies with the voltage thereacross. Accordingly, since the voltage across terminals 20a–20b is equal to the voltage across winding 16p, it will be seen that the magnitude of the current flowing out of terminal 20 is equal to the magnitude of the magnetizing current flowing through transformer 16.

In addition, since inverting amplifier input 24a is used as the signal input of amplifier 24, a 180° phase shift appears between the current out of generator terminal 20b and the magnetizing current flowing through primary winding 16p. As a result, the current produced by generator 20 cancels the magnetizing current through primary winding 16p as both currents are applied to input 18a of current indicating means 18.

We have found that by proper selection of component values for resistors 26, 28 and 30 and capacitor 32, the current out of generator output 20b may be made to cancel the magnetizing component of the current through primary winding of a given transformer such as 16 for all frequencies of a multi-frequency signal. In the present embodiment this is accomplished by setting the product of the resistances of resistors 28 and 30 and the capacitance value of capacitor 32 equal to the magnetizing inductance of primary winding 16p and by setting the series resistance of primary winding 16p equal to the resistance of resistor 30 multiplied by the ratio of the resistances of resistors 28 and 26.

In view of the foregoing, it will be seen that a compensating circuit constructed in accordance with the invention is adapted to eliminate magnetizing current as a source of error in those multifrequency current measurements which must be made through transformers and thereby allow accurate measurement of the instantaneous current in the secondaries thereof.

It will be understood that the above described embodiment is for illustrative purposes only and may be changed or modified without departing from the spirit and scope of the appended claims.

What is claimed is:

1. In a circuit for improving the accuracy of current measurements made through transformers, in combination, a transformer having a primary winding, current indicating means for generating a voltage which varies in accordance with the current through the primary winding of said transformer, means for connecting said current indicating means to said transformer, compensating current generating means for generating a current having a magnitude substantially equal to the magnetizing current component of the current through said primary winding and having substantially a 180° phase displacement from said magnetizing current component, and means for connecting said compensating current generating means to said current indicating means to cancel the effect of said magnetizing current component thereupon.

2. A circuit as set forth in claim 1 including means for connecting said generating means across the primary winding of said transformer.

3. A circuit as set forth in claim 1 in which said generating means includes an operational amplifier having a feedback network adapted to cause said amplifier to exhibit an inductive voltage-current characteristic.

4. In a circuit for improving the accuracy of current measurements made through a load supplying transformer, in combination, a transformer having a primary winding and a secondary winding, means for connecting a load across said secondary winding, means for connecting an energizing source to said primary winding, current indicating means having input means and output means, said indicating means serving as means for generating a voltage at the output means thereof which is substantially proportional to the algebraic sum of the currents applied to the input means thereof, means for connecting said input means to said primary winding to conduct current through said primary winding, compensating current generating means having input means and output means, said generating means serving as means for generating from said output means a current which is substantially equal and opposite to the magnetizing component of current through said primary winding, means for connecting the input means of said generating means to said primary winding and means for connecting the output means of said generating means to the input means of said indicating means.

5. A circuit as set forth in claim 4 in which said indicating means includes an operational amplifier having an inverting input and an output, a resistor and means for connecting said resistor between said output and said inverting input.

6. A circuit as set forth in claim 4 in which said generating means includes an operational amplifier having an inverting input and an output, resistance-capacitance means for causing said operational amplifier to exhibit an inductive voltage-current characteristic and means for connecting said resistance-capacitance means to the output and inverting input of said operational amplifier.

7. In a circuit for improving the accuracy of current measurements made through a load supplying transformer, in combination, a transformer including a primary winding and a secondary winding, means for connecting a load across said secondary winding, current indicating means for producing an output which varies in accordance with the current through said primary winding, means for connecting said primary winding and said current indicating means in series across a source of voltage, compensating current generating means for generating a current which is substantially equal to the magnetizing component of the current through said primary winding, means for connecting said compensating current generating means to said primary winding and means for applying the current produced by said generating means to said indicating means to cancel the effect of the magnetizing component of the current through said primary winding.

8. A circuit as set forth in claim 7 in which said current indicating means is arranged to have a negligible effect upon the voltage across and current through said primary winding.

9. A circuit as set forth in claim 7 in which said generating means comprises an operational amplifier having an inverting input, an output, a first resistor connected between said input and output, a capacitor connected in parallel with said first resistor and second and third resistors connected to the inverting input and output of said operational amplifier, respectively.

10. A circuit as set forth in claim 7 in which said indicating means includes an operational amplifier having an inverting input and an output, a resistor, and means for connecting said resistor between said output and said inverting input.

* * * * *